United States Patent
Roether et al.

(10) Patent No.: US 6,792,971 B2
(45) Date of Patent: Sep. 21, 2004

(54) PILOT CONTROL VALVE HAVING A PRESSURE COMPENSATION

(75) Inventors: Friedbert Roether, Cleebronn (DE); Siegmund Deja, Freiberg (DE); Eberhard Schaffert, Leonberg (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/692,717

(22) Filed: Oct. 27, 2003

(65) Prior Publication Data

US 2004/0084090 A1 May 6, 2004

Related U.S. Application Data

(63) Continuation of application No. PCT/EP02/04629, filed on Apr. 26, 2002.

(30) Foreign Application Priority Data

Apr. 26, 2001 (DE) .......................................... 101 20 319

(51) Int. Cl.[7] .............................. B60T 13/68; B60T 8/36
(52) U.S. Cl. ................ 137/377; 137/625.64; 137/627.5
(58) Field of Search ................................. 137/377, 382, 137/625.64, 627.5

(56) References Cited

U.S. PATENT DOCUMENTS 6,059,382 A * 5/2000 Schoettl ................... 303/119.3
6,102,494 A * 8/2000 Volz et al. ................. 303/116.4
6,354,674 B1 * 3/2002 Iwamoto et al. ........... 303/119.3

FOREIGN PATENT DOCUMENTS

| DE | 196 05 562 A1 | 8/1997 |
|---|---|---|
| DE | 197 12 209 A1 | 10/1998 |
| EP | 1 022 204 A2 | 7/2000 |
| JP | 2000-168529 | 6/2000 |

* cited by examiner

Primary Examiner—Ramesh Krishnamurthy
(74) Attorney, Agent, or Firm—Crowell & Moring LLP

(57) ABSTRACT

The invention relates to a piloted valve, in particular an electropneumatic control valve for a pneumatic brake system of a vehicle. Said valve comprises a divided valve housing, in which at least one control piston that can be axially displaced for actuating a valve seat arrangement, which switches the compressed air flow between external connections, is located. The control piston can be impinged by at least one electromagnetic pilot valve to cause the axial displacement, said valve being lodged in a pilot valve housing part that is connected to the relay valve housing part, whereby a pressure compensation channel with multiple bends is configured in the vicinity of the wall of the control chamber in the valve housing for bleeding a pressureless hollow chamber in the interior of the valve. The outlet opening of said channel that leads to the exterior is located at a distance behind a cover hood on the valve housing and is protected against water splashes. The section of said channel that lies in close proximity to the hollow chamber is provided with an interchangeable pressure compensation element.

13 Claims, 2 Drawing Sheets

TEFLON PELLET

PILOT CONTROL VALVE HAVING A PRESSURE COMPENSATION

CROSS-REFERENCE TO RELATED APPLICATIONS

This application is a continuation of PCT Application No. PCT/EP02/04629 filed Apr. 26, 2002.

BACKGROUND AND SUMMARY OF THE INVENTION

The invention relates to a pilot control valve, particularly an electropneumatic control valve for a pneumatic braking system of a vehicle, having a divided valve housing, in which at least one axially adjustable control piston is arranged for actuating a valve seat arrangement. The valve seat arrangement switches the compressed air flow between external connections, in which case the control piston can be acted upon by way of at least one electromagnetic pilot valve for the axial adjustment. The pilot valve is housed in a pilot valve housing part connected with the relay valve housing part. In particular, the present invention relates to a special further development of a valve-internal pressure compensation channel.

A pilot control valve of the above-mentioned type is used particularly within a pneumatic braking system of a vehicle, which valve, especially in this case, is constructed as an electropneumatic control valve. The control valve has the object of adjusting a brake pressure corresponding to the desired braking effect. For this purpose, a brake line originating from the control valve is usually connected with a brake cylinder arranged directly at the vehicle wheel. The brake cylinder generates the braking power required for braking the vehicle wheel by means of a disk or drum brake connected thereto. The defining of the desired pressure value for the electropneumatic control valve takes place mainly electrically. In addition, for reasons of safety, usually a parallel pneumatic control is provided, which parallel control is used in the event of a failure of the electric control.

Such an electropneumatic control valve is known from German Patent Document DE 196 05 562 A1. The control valve has a large-surface control piston which is axially accommodated inside a cylindrical hollow space of the valve housing. In this case, the control piston separates the hollow space into a control chamber as well as a working chamber. On the part of the working chamber, a coaxial hollow journal is constructed on the control piston, which hollow journal is used for actuating an adjacent valve seat arrangement. By means of an axial adjustment of a spring-tensioned valve tube, the valve seat arrangement switches the compressed air flow between an external brake line connection, a supply pressure connection as well as a bleeding connection.

On the part of the control chamber, the control piston can be acted upon by a control pressure which is generated by means of the pilot valve arrangement. Here, the pilot valve arrangement consists of two electromagnetic pilot valves which, as a result of a coordinated energizing of the integrated electric coils cause an increase, holding or decrease of the control pressure within the control chamber. A force resulting from the brake pressure is applied to the opposite side of the control piston.

The valve housing may be divided into two main components, in which case, essentially the valve seat arrangement with the external connections is provided in a bottom relay valve housing part, and the pilot valves are accommodated in a top pilot valve housing part. The hollow spaces inside the valve housing are partly used as pressure chambers for exercising the valve function; however, pressureless valve-internal hollow spaces are partly also provided, for example, for housing the electronic unit for controlling the pilot valves. In this case, it is necessary that the electronic unit is free of excess pressure influences or vacuum influences.

For this purpose, it is generally known to provide a corresponding pressure compensation channel which establishes a connection between the valve-internal hollow space and the atmosphere. Normally, a control valve for a pneumatic braking system of a vehicle or comparable valves are mounted in a manner unprotected from external environmental influences on the vehicle or the like. So that no external environmental influences, such as rain water, can reach the valve-internal hollow space through the pressure compensation channel, it has been attempted to let the outlet opening of the pressure compensation channel exit from the valve housing at a protected point. However, it was found that this solution does not reliably ensure the desired tightness or protection effect. Thus, for example, when the valve is cleaned by means of a steam jet, cleaning water may enter the interior of the valve.

In order to solve this problem, it has also been attempted to extend the bleeding channel from the hollow space directly to the bleeding connection, which is normally provided with an additional muffler which offers the desired protection. An additional protection against the penetration by external environmental influences is achieved in the state of the art in that a pressure compensation element is placed in the pressure compensation channel. The pressure compensation element permits an air exchange on both sides through a porous microstructure and simultaneously prevents water from entering in the direction of the hollow space.

This known measure also has unsatisfactory results. The pressure compensation channel leading out in the area of the bleeding connection of the valve, as a result of a reaction of the pressure existing here when the valve is bled, leads to an undesirable pressure excess in the electronic space.

It is therefore an object of the present invention to further improve the above-described pilot control valve such that an effective pressure compensation of a valve-internal hollow space is achieved using simple devices and measures.

This and other objects are achieved by providing a pilot control valve, particularly an electropneumatic control valve for a pneumatic braking system of a vehicle, having a divided valve housing, in which at least one axially adjustable control piston is arranged for actuating a valve seat arrangement, which switches the compressed air flow between external connections. The control piston is being capable of being acted upon by way of at least one electromagnetic pilot valve for axial adjustment, which pilot valve is housed in a pilot valve housing part connected with the relay valve housing part. For bleeding a pressureless valve-internal hollow space, a multiple-bend pressure compensation channel is provided, which is formed in the area of the wall of the control chamber in the valve housing. The outlet opening of the compensation channel extending to the outside is arranged behind a spaced covering hood on the valve housing in a manner protected from splashing water. The channel section of the compensation channel close to the hollow space is provided with an exchangeable pressure compensation element.

The invention technically provides that, for bleeding a pressureless valve-internal hollow space, a multiple-bend pressure compensation channel is formed in the area of the wall of the control chamber in the valve housing. Its outlet opening extending to the outside is arranged behind a spaced covering hood on the valve housing in a manner protected from splashing water and its channel section close to the hollow space is provided with an exchangeable pressure compensation element.

The advantage of this special channel construction is, in particular, that pressure compensation now takes place in a housing area of the valve to the outside which, as a result of the covering hood provided for a different purpose, is arranged in an already relatively protected manner from penetration by splashing water and dirt. The developed embodiment of the pressure compensation channel represents another effective protective measure. A pressure compensation element is inserted only in the area of the pressure compensation channel close to the hollow space, which pressure compensation element is easily mountable or exchangeable because of the external accessibility. For the connection of an electronic unit housed inside the hollow space constructed as an electronic space, a corresponding electric connector arrangement may be arranged on the valve housing, which connector arrangement is provided with the covering hood for protecting against external environmental influences. The covering hood is preferably simultaneously used for the protection of the outlet opening of the pressure compensation channel which, to this extent, is also placed behind this covering hood. The specific sequence of these measures provides a protected and effective pressure compensation.

The valve housing of the pilot control valve is normally produced by casting. The valve-internal pressure compensation channel can advantageously be formed in the valve housing directly during the casting. Furthermore, it is also contemplated to form the pressure compensation channel after the production of the valve housing by drilling or the like.

When the pilot control valve is constructed as an electropneumatic control valve for a compressed-air system of a vehicle, the valve housing is preferably constructed of a separate relay valve housing part and also a separate pilot control valve housing part correspondingly constructed in a common connection plane. In this case, the two housing parts are fastened to one another in a pressure-sealed and releasable manner—for example, by means of screwing—by way of an essentially ring-shaped sealing element which encloses the interior control chamber. The valve housing divided in this manner permits a simple mounting of the interior valve components.

In the case of the valve housing constructed in this manner, the pressure compensation channel may be arranged on the outlet side in the case of the relay valve housing part and may be continued by way of a corresponding opening in the sealing element inside the pilot valve housing part toward the electronic space. By means of this course of the channel, the above-described desired position of the outlet opening of the pressure compensation channel is achieved, in which case the constructional marginal conditions existing as a result of the divided construction of the valve housing are taken into account.

Other objects, advantages and novel features of the present invention will become apparent from the following detailed description of the invention when considered in conjunction with the accompanying drawings.

DETAILED DESCRIPTION OF THE DRAWINGS

Figure 1:
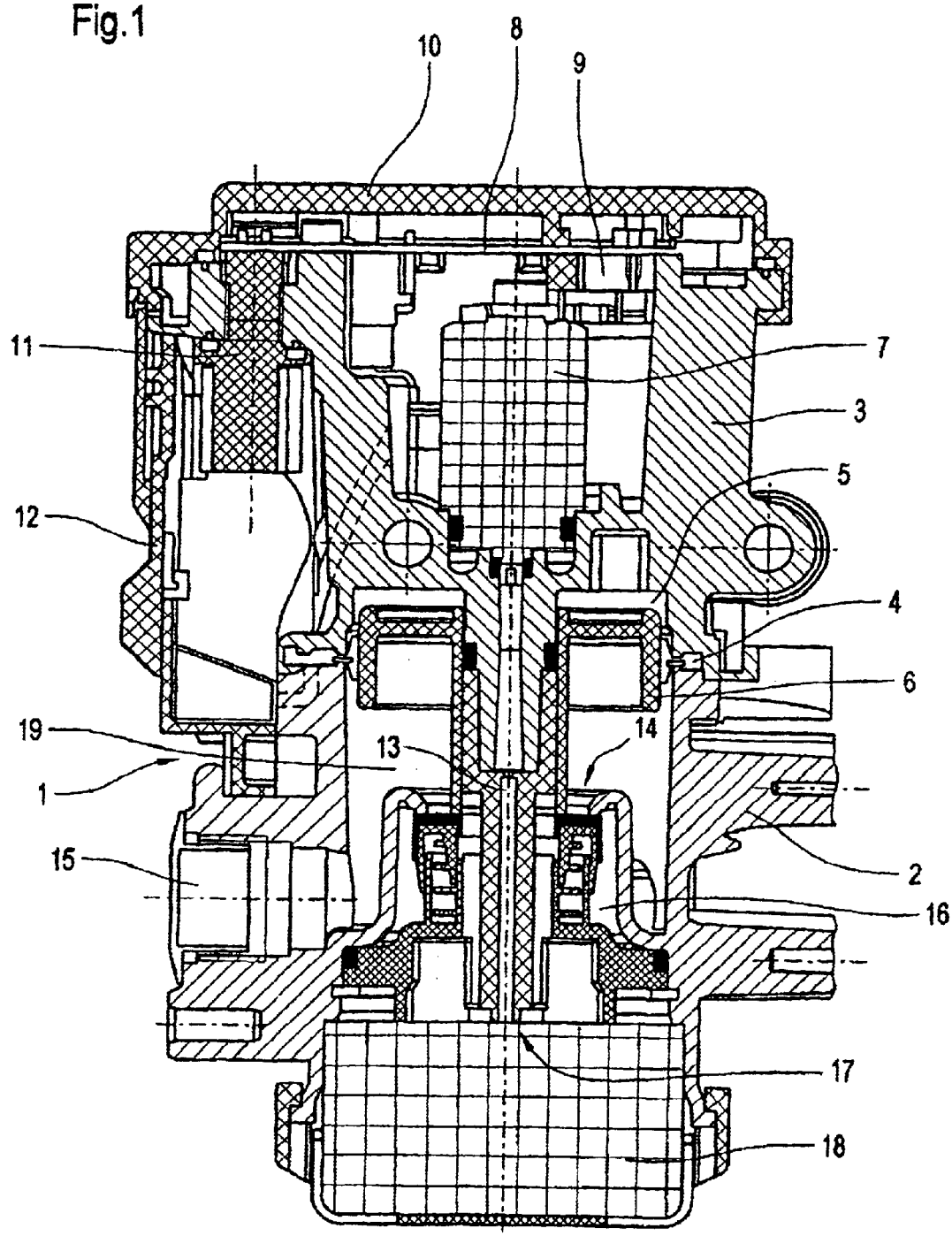
FIG. 1 is a longitudinal sectional view of an electropneumatic control valve according to the invention.

According to FIG. 1, a pilot control valve, specified as an electropneumatic control valve, has a valve housing 1 which is essentially constructed in two parts and which consists of a bottom relay valve housing part 2 which is connected with a top pilot valve housing part 3 by way of an intermediate ring-shaped sealing element 4. The connection is implemented by screwing (not shown in detail) the part together. The relay valve housing part 2, in cooperation with the pilot valve housing part 3, encloses an interior control chamber 5, in which a control piston 6 is arranged in an axially movable manner.

A pilot valve arrangement accommodated in the pilot valve housing part 3 is used for the axial adjustment of the control piston 6. In the figure, only a pilot valve 7 used as an outlet magnet of the pilot valve arrangement is shown here. The pilot valve arrangement is electrically controlled by means of an electronic unit 8, which is constructed in an electronic space 9 in the shape of a valve-internal hollow space. The electronic space 9 can be sealingly closed by means of a lid 10. The electronic unit 8 is connected with a central control unit (which is not shown here in detail). The electric connection is established by way of a connector arrangement 11 mounted on the electronic unit 8. The connector arrangement 11 is situated behind a covering hood 12 so as to be protected from splashing water. The covering hood 12 is detachably mounted on the valve housing 1.

The illustrated pilot valve 7 is used as an outlet valve and, to this extent, when electrically actuated by way of the electronic unit 8, bleeds the control chamber 5. The outgoing air, by way of a bleeding channel 13, is discharged into the atmosphere. In addition, a second pilot valve (not shown here) is provided as an inlet valve and is used for admitting a control pressure to the control chamber 5 in order to move the control piston 6.

When the control chamber 5 is acted upon, the control piston 6 actuates a valve seat arrangement 14 by way of a lower sleeve-type shaped-on part in the area of the coaxial housing-internal axial guidance of the control piston 6. By way of this valve seat arrangement 14, the compressed-air flow can be switched between a brake line connection 15 arranged on the relay valve housing part 2, on the one hand, as well as a feeding pressure connection (not visible here), which is also connected with an internal feeding pressure chamber 16, and a bleeding connection 17, on the other hand. The bleeding connection 17 is additionally equipped with a muffler 18 for reducing noise.

The electropneumatic control valve is illustrated in FIG. 1 in a closed-off switching position, in which a compressed-air flow does not take place. When the control chamber 5 is acted upon by a control pressure and the control piston 6 is then moved in the direction of a lower switching position, as a result of the opening of the valve seat arrangement 14, a compressed-air flow will then take place, starting from the feeding pressure chamber 16, to a working chamber 19 situated below the control piston 6, for the brake line connection 15, in order to thereby increase the brake pressure.

During bleeding of the control chamber 5, the control piston 6 is changed into an upper switching position, in which case, as a result of an opposed opening of the valve seat arrangement 14, compressed air originating from the brake line connection 15 will reach the bleeding connection by way of the working chamber 19 in order to correspondingly lower the brake pressure. The brake pressure is therefore controlled by a reciprocal movement of the control piston 6 corresponding to a desired pressure value, which can be defined by the electronic unit 8. For bleeding the electronic space 9, which is to be kept pressureless, a pressure compensation channel is provided which is not visible in the sectional view.

Figure 2:
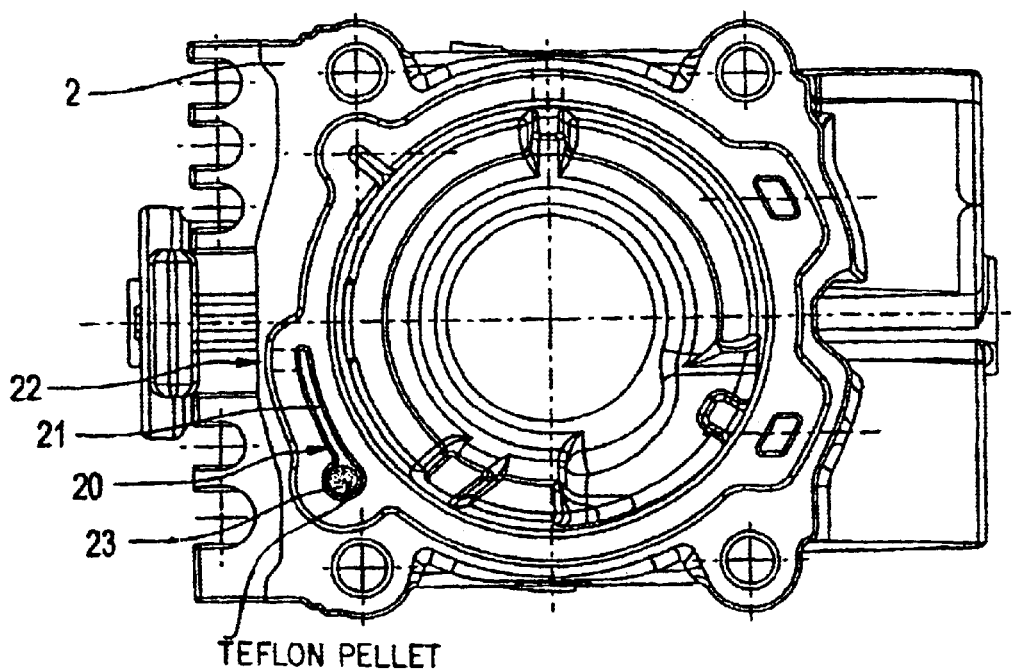
FIG. 2 is a top view of the relay valve housing part of the control valve according to FIG. 1.

With respect to the representation according to FIG. 2, the pressure compensation channel 20 extends for the most part inside the wall of the relay valve housing part 2. At an angle thereof, the pressure compensation channel 20 leads out toward one side in a curved recess 21 extending in the connection plane to the adjacent (not shown) pilot valve housing part, by way of a transverse channel section, into an outlet opening 22. By way of a base bore 23 arranged to the other side of the curved recess 21, the transition takes place through a corresponding opening in the sealing element (not shown here in detail) into the electronic space of the pilot valve housing part.

Figure 3:
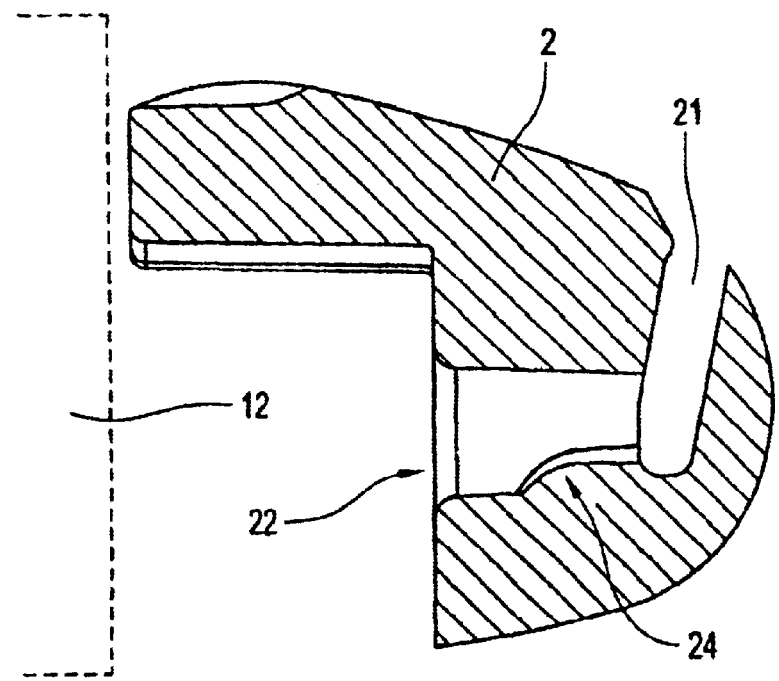
FIG. 3 is a cutout-type longitudinal sectional view of the relay valve housing part in the area of the outlet opening of the pressure compensation channel.

As illustrated in detail in FIG. 3, the outlet opening 22 of the pressure compensation channel 20 adjoins a transverse-channel section 24, which leads into the center area of the wall of the relay valve housing part 2. From there, the recess 21 follows at an angle in the direction of the electronic space of the pilot valve housing part (which electronic space is not shown here). By means of the covering hood 12, the outlet opening 22 is additionally protected against splashing water.

The invention is not limited to the above-indicated preferred embodiment. On the contrary, modifications thereof are conceivable which can use the scope of protection defined by the claims which follow. In particular, the present invention is not restricted to a pilot control valve with a valve housing constructed in only two parts. The valve housing may also be constructed in a one-part manner or may constructed of more than two parts when corresponding adaptations are made, which adaptations are obvious to a person skilled in the art. Furthermore, the present invention can also be used in the case of a valve which can be used as an electropneumatic double control valve with two control pistons arranged inside the same valve housing and, respectively, assigned valve seat arrangements, at least one pressure compensation channel being provided for a possibly joint electronic space.

| Table of Reference Numbers | |
|---|---|
| 1 | Valve housing |
| 2 | relay valve housing part |
| 3 | pilot valve housing part |
| 4 | sealing element |
| 5 | control chamber |
| 6 | control piston |
| 7 | pilot valve |
| 8 | electronic unit |
| 9 | electronic space |
| 10 | lid |
| 11 | connector arrangement |
| 12 | covering hood |
| 13 | bleeding channel |
| 14 | valve seat arrangement |
| 15 | brake line connection |
| 16 | feeding pressure connection |
| 17 | bleeding connection |

| Table of Reference Numbers -continued | |
|---|---|
| 18 | muffler |
| 19 | working chamber |
| 20 | pressure compensation channel |
| 21 | recess |
| 22 | outlet opening |
| 23 | bore |
| 24 | transverse channel section |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pilot control valve, comprising:
   a divided valve housing;
   at least one axially adjustable control piston arranged in the divided valve housing for actuating a valve seat arrangement to switch compressed air flow between external connections;
   at least one electromagnetic pilot valve operatively arranged to axially adjust positions of the control piston, the pilot valve being housed in a pilot valve housing part of the divided valve housing that is connected with a relay valve housing part of the divided valve housing;
   a multiple-bend pressure compensation channel for bleeding a pressureless valve-internal hollow space, the pressure compensation channel being formed in a wall area of a control chamber in the divided valve housing, the pressure compensation channel having an exterior outlet opening and a channel section;
   a covering hood arranged on the divided valve housing, the covering hood protecting the exterior outlet opening from external water influences; and
   an exchangeable pressure compensation element provided for the channel section close to the pressureless valve-internal hollow space.

2. The pilot control valve according to claim 1, wherein the pressureless valve-internal hollow space provides an electronic space in which an electronic unit is arranged for controlling the at least one pilot valve.

3. The pilot control valve according to claim 2, further comprising:
   an electric connector arrangement for connecting the electronic unit; and
   wherein the covering hood covers the electric connector arrangement.

4. The pilot control valve according to claim 1, wherein the pressure compensation channel is cast directly into the divided valve housing.

5. The pilot control valve according to claim 1, wherein the pressure compensation channel is a drilled channel in the divided valve housing.

6. The pilot control valve according to claim 1, further comprising:
   a substantially ring-shaped sealing element; and
   wherein the relay valve housing part and the pilot valve housing part have a common connection plane and are fastened to one another in a releasable and pressure-sealed manner via the substantially ring-shaped sealing element.

7. The pilot control valve according to claim 6, wherein the pressure compensation channel has the exterior outlet opening arranged in the relay valve housing part and extends via an opening in the ring-shaped sealing element inside the pilot valve housing part to the pressureless valve-internal hollow space.

8. The pilot control valve according to claim 7, wherein the pressure compensation channel comprises:

a transverse channel section originating from the exterior outlet opening and leading into a center wall area of the relay valve housing part;

a bore extending from the transverse channel section in a direction of the pressureless valve-internal hollow space, the bore leading into a curved recess in an area of the sealing element, which curve recess extends in the common connection plane and which changes by way of the opening in the sealing element to a channel section; and wherein the channel section is formed in the pilot valve housing part and leads into the pressureless valve-internal hollow space.

9. The pilot control valve according to claim 6, wherein the pressure compensation element is a Teflon pellet inserted directly into an opening of the sealing element.

10. The pilot control valve according to claim 1, wherein the pilot control valve is an electropneumatic control valve for a pneumatic braking system of a vehicle.

11. A pilot control valve, comprising:

a divided valve housing in which is formed a control chamber and a pressureless valve-internal hollow space;

a covering hood arranged on the valve housing;

a pressure compensation channel having multiple bends for bleeding the pressureless valve-internal hollow space, the pressure compensation channel being formed in a wall area of the control chamber of the valve housing and has an outlet opening and a channel section;

an exchangeable pressure compensation element arranged in the channel section of the pressure compensation channel; and wherein the outlet opening of the pressure compensation channel is arranged behind the covering hood.

12. The pilot control valve according to claim 11, further comprising:

an electric connector arrangement provided for the pilot control valve; and wherein the covering hood also covers the electric connector arrangement.

13. The pilot control valve according to claim 11, further comprising:

a substantially ring-shaped sealing element; and wherein a relay valve housing part and a pilot valve housing part having a common connection plane are fastened to one another in a releasable and pressure-sealed manner via the substantially ring-shaped sealing element.

* * * * *